United States Patent [19]
Sumner et al.

[11] Patent Number: 5,886,106
[45] Date of Patent: Mar. 23, 1999

[54] HALOGENATED BUTYL RUBBERS HAVING A LOW HALOGEN CONTENT

[75] Inventors: Anthony Sumner, Köln; Stefan Kelbch, Much, both of Germany; Albert Verbiest, Antwerp, Belgium

[73] Assignee: Bayer Aktiengesellschat, Germany

[21] Appl. No.: 841,070

[22] Filed: Apr. 29, 1997

[51] Int. Cl.$^6$ ........................................................ C08F 8/22
[52] U.S. Cl. ..................... 515/332.8; 515/332.3; 515/356; 524/572
[58] Field of Search ................................ 525/332.8, 356, 525/332.3; 524/572

[56] References Cited

U.S. PATENT DOCUMENTS 4,104,218   8/1978   Hous .
4,254,240   3/1981   Newman et al. .

FOREIGN PATENT DOCUMENTS 0 385 760    9/1990    European Pat. Off. .
12 91 237B   3/1969    Germany .
2 072 576   10/1981    United Kingdom .

*Primary Examiner*—Bernard Lipman
*Attorney, Agent, or Firm*—Connoly & Hutz

[57] ABSTRACT

New halogenated butyl rubbers, which have a defined content of halogen, a defined content of non-halogenated double bonds and a defined content of antiagglomeration/vulcanization control agents, exhibit outstanding mechanical and physiological properties, so that they are suitable for the production of tires, particularly tire inner liners, tire sidewalls and tire treads, and for pharmaceutical rubber articles.

2 Claims, No Drawings

HALOGENATED BUTYL RUBBERS HAVING A LOW HALOGEN CONTENT

The present invention relates to new halogenated butyl rubbers having a low halogen content, to a method of producing them and to their use for the production of vulcanised rubber materials.

The use of halogenated butyl rubbers is known for the production of tires in particular, since halogenated butyl rubbers have proved to be particularly advantageous as regards their adhesion behaviour, flexural strength and service life and as regards their impermeability to air and water. On account of the balance between the aforementioned physical properties, halogenated butyl rubbers are preferably used for tire construction, and are employed there in particular for the production of tire inner liners. Due to the use of tire inner liners which are based on halogenated butyl rubbers, the tire carcass and the steel or textile cords which are employed therein are protected from attack by moisture and oxygen contained in the air inflation. This has a positive effect on the life of pneumatic tires, particularly those of highly stressed truck tires.

There has been no lack of attempts aimed at improving the physical properties of halogenated butyl rubbers, for example by increasing the halogen content in the butyl rubber (improvement of the adhesion properties). In this connection, we refer to U.S. Pat. No. 2,698,041, to British Patent Application GB 2 072 576 and to European Patent Application EP 0 385 760, where halogenated butyl rubbers are described, as are their use and application in tire construction.

Due to the disadvantages of using pure halogenated butyl rubbers as the rubber material for inner liners (see EP 0 385 760), the use of compounds comprising halogenated butyl rubbers and pure butyl rubber has recently been proposed. This is claimed to reduce the formation of cracks in the inner liners due to thermal hardening processes, which ultimately has a positive effect on the life of pneumatic tires.

Disadvantages of the halogenated butyl rubbers or compounds comprising halogenated butyl rubbers with pure butyl rubbers described in the above prior art include, for example, their unsatisfactory ageing behaviour, the formation of a hydrogen halide with a corrosive action during the crosslinking process and the low rates of crosslinking for the blends described, which impedes productivity during the manufacture of tires.

The object of the present invention is therefore to provide halogenated butyl rubbers which ensure an overall improvement in the aforementioned properties without the use of blends of halogenated butyl rubbers and non-halogenated butyl rubbers being necessary.

This object is achieved by the provision of new halogenated butyl rubbers having a defined, low content of halogen, a defined content of non-halogenated double bonds and a defined content of anti-agglomeration/vulcanisation control agents.

Accordingly, the present invention relates to halogenated butyl rubbers which are characterised in that they have a halogen content of 0.5 to 2.5% and a content of non-halogenated double bonds greater than 0.7 mole %, and their content of antiagglomeration/vulcanisation control agents is 1.0 to 2.2% by weight with respect to the total amount of halogenated butyl rubber.

According to the invention, halogenated butyl rubbers are understood to be those butyl rubbers which are halogenated by chlorine and/or bromine, preferably by bromine.

The halogenated butyl rubbers which are preferred according to the invention are those with a content of non-brominated double bonds of 0.7 to 1.0 mole %, particularly 0.75 to 0.95 mole %, and a content of anti-agglomeration/vulcanisation control agents of 1.25 to 2.0% by weight, particularly 1.45 to 2.0% by weight.

The halogen content of the butyl rubbers according to the invention is preferably 0.8 to 1.9%. For bromobutyl rubber the bromine content is preferably 1.4 to 1.8%.

According to the invention, the term "butyl rubber" is understood to mean copolymers based on isoolefins and olefins, such as those which are described in the aforementioned U.S. Pat. No. 2,698,041 and in the other prior patent publications cited. The butyl rubbers are characterised in particular by a content of 70 to about 99.5% by weight of isoolefins containing 4 to 8 carbon atoms, such as isobutylene, 3-methylbutene-1,4, methylpentene-1,2, ethylbutene-1 and/or 4-ethylpentene-1, particularly isobutene, and by a content of about 0.5 to 30% by weight of dienes containing 4 to 18 carbon atoms, such as isoprene, butadiene-1,3, 2,4-dimethylbutadiene-1,3, piperyline, 3-methylpentadiene-1,3, hexadiene-2,4, 2neopentyl-butadiene-1,3, 2-methythexadiene-1,5, 2-methyl-pentadiene-1,4, 2-methylheptadiene-1,6, cyclopentadiene, cyclohexadiene, 1-vinyl-cyclohexadiene and mixtures thereof. In addition, other monomers can be used in the customary amounts, such as styrene, chlorostyrene and/or α-methylstyrene.

Butyl rubbers with a content of isoolefins of 95 to 99.9% by weight and a content of dienes of 0.5 to 5.0% by weight are particularly preferred. In this connection, the use of butyl rubbers based on isobutene and isoprene is particularly preferred.

The halogenated butyl rubbers according to the invention are characterised by a defined content of non-halogenated double bonds, a defined content of antiagglomeration/vulcanisation control agents and a defined halogen content. It is therefore important that the production of the butyl rubber starting from the aforementioned monomers is conducted in such a way that the required contents are obtained. The butyl rubber can be produced in the usual manner, by polymerisation in solution, in the gas phase or by the slurry method. Polymerisation is preferably conducted in suspension (slurry method) (see Bayer Handbook for the Rubber Industry, Section A 9.1, page 208 (1991), for example).

The following are particularly suitable as anti-agglomeration/vulcanisation control agents: salts of fatty acids which are based on fatty acids containing 8 to 22 carbon atoms, preferably 12 to 18 carbon atoms, such as calcium, magnesium, potassium and/or ammonium stearates and palmitates, as well as oleates. Silicates, such as calcium silicate, are also suitable as anti-agglomeration/vulcanisation control agents. The anti-agglomeration/vulcanisation control agents may be used individually or in admixture with each other. The most favourable mixture ratio can easily be determined by appropriate preliminary tests. Calcium stearate and/or calcium palmitate are preferably used.

During the production of the butyl rubbers which are used as the starting materials for the halogenated butyl rubbers according to the invention, it must be ensured that the anti-agglomeration/vulcanisation control agents are used in amounts which correspond to the aforementioned quantitative ranges.

The halogenated butyl rubbers according to the invention can be produced either by treating finely divided butyl rubber with halogenating agents, such as chlorine or bromine, preferably bromine, or by producing bromobutyl rubbers by the intensive mixing, in a mixing apparatus, of brominating agents such as N-bromosuccinimide with the butyl rubber on which they are based, or by treating a solution or a dispersion in organic solvents of the butyl rubber on which they are based with corresponding brominating agents (see the Bayer Handbook for the Rubber Industry, Section A 9.1, page 208 (1991), for example).

In the course of this procedure, the halogenation of the basic butyl rubbers is controlled so that the residual content of non-halogenated or non-brominated double bonds remains within the ranges defined above. At the same time, the content of halogen, preferably bromine, falls within the aforementioned ranges. The halogenated butyl rubbers according to the invention can be used for the production of vulcanised rubber materials, for example by mixing the halogenated butyl rubbers with carbon black, hydrated silica or other known ingredients (additives) and crosslinking with sulphur, for example, in the usual manner.

The halogenated butyl rubbers are primarily used for the production of tires, particularly for the production of tire inner liners and tire sidewalls, and are also used for tire treads. In addition, the halogenated butyl rubbers are used for pharmaceutical applications such as flexible tubes and stoppers. Moreover, it is also possible to compound the halogenated butyl rubbers in the usual amounts with all known synthetic rubbers and natural rubbers and with customary fillers such as carbon blacks or hydrated silicas.

The halogenated butyl rubbers according to the invention possess the following advantages compared with the halogenated butyl rubbers or the compounds thereof with pure butyl rubbers which have been known hitherto: constant adhesion of the tire inner liner to the carcass, a higher rate of crosslinking, reduced growth of cracks during the life of the inner liner, and, in particular, considerably improved resistance to ageing and, coupled therewith, a longer service life of the inner liner and of the tire.

EXAMPLES

A commercially available butyl rubber supplied by Bayer-Rubber N.V., Antwerp, Belgium, with the brand name Polysar® Butyl 301, was used for the production of halogenated butyl rubbers according to the invention. This butyl rubber had the following composition and physical properties:

isoprene content: 1.55 to 1.95 mole %,
isobutylene content: 97.5 to 98.0,
Mooney viscosity $M_L 1+8$ at 125° C.: 51±5.

This initial butyl rubber was brominated in the following manner:

A 15 to 20% by weight solution of the aforementioned butyl rubber in hexane was first prepared. 36 kg bromine per 1000 kg of butyl rubber were added to the butyl rubber polymer solution under carefully controlled conditions. Bromination was conducted at 50° C. with intensive mixing of the polymer solution in hexane. After completion of the reaction, the solution was neutralised with 50% by weight sodium hydroxide solution, and 21 kg calcium stearate per 1000 kg of butyl rubber were added to this mixture, together with 13.5 kg of epoxidised soya bean oil per 1000 kg as a stabiliser. The solvent was then evaporated in the usual manner. The residue comprised a rubber suspension from which the solid rubber was obtained in the usual manner. The bromobutyl rubber obtained had a bromine content of 1.76%, a content of non-halogenated double bonds of 0.77 mole % and a fatty acid salt content of 2.10% by weight, with respect to the total amount of butyl rubber used (bromobutyl rubber A).

Bromobutyl rubbers B, C and D were produced in the same manner—as described above (Table 1). Comparison samples E and F were bromobutyl rubbers produced in the same manner. Rubber E had the properties of standard Polysar® Brombutyl 2030, and had a halogen content and a content of fatty acid salt which were higher than those of the rubbers according to the invention. Rubber F had a lower halogen content and a lower content of fatty acid salt than the rubbers according to the invention. Rubber G constituted a blend of 70 parts Polysar® Brombutyl 2030 and 30 parts Polysar® Brombutyl 402. Compounds M(A) to M(G) were formulated using the bromobutyl rubbers of Table 1 (Table 2). The components of the compounds in Table 2 were carbon black (Corax N660, obtainable from Degussa), mineral oil (Sunpar 2280, obtainable from Sun Oil), resin (Pentalyn A, obtainable from Hercules), stearic acid (obtainable from Henkel), and MBTS (Vulkacit DM/MG, obtainable from Bayer).

These compound components were mixed in a Werner & Pfleiderer GK 1.5 E internal mixer. Thereafter, zinc oxide and sulphur were added on a roll. After the final mixing on the roll, test bodies were produced. The vulcanisation behaviour (scorch time, $t_{90}$, maximum torque) was measured using an MDR 2000 rheometer (supplied by Flexsys). Amongst other properties, the mechanical properties, the dynamic tear resistance, and the adhesion to the carcass were determined as the vulcanisation properties.

The dynamic tear resistance was measured using the Bayer tear analyser which was described by U. Eisele, S. A. Kelbch and H. W. Engels in Kautsch., Gummi, Kunstst. 45, 1064 (1992). This machine enables the loading and environmental conditions of rubber components of tires in operation to be simulated. It had been shown that it was possible to obtain good correlations between the results of this special laboratory test and the results of tire tests for a series of different tire components, including inner liner compounds (see A. J. M. Sumner, S. A. Kelbch and U. G. Eisele, Proceedings of the 146th ACS Rubber Division Meeting, October 1994, Pittsburgh, Paper 18). Rubber strips (60×15×1.5 mm) with a lateral incision (about 1 mm deep) were used as test specimens. Testing was performed under controlled environmental conditions which corresponded to those in a tire.

A servo-hydraulic drive moved a reciprocating piston with the lower sample holders. The specimens could be subjected to any desired, time-dependent alternation of load within the range of capability of the servo-hydraulics. A pulse-like type of loading is customary for tire compounds. Each (black) specimen (a maximum of 10 simultaneously), which was illuminated from the rear, was connected to a load cell, which in turn was attached to a stepper motor control device. By means of the load cell, firstly the time-dependent stress in the material was measured, and secondly the minimum force (initial stress) was regulated via the stepper motors. In addition to the minimum and maximum stresses and the strain, the stored energy densities and the tension set of the specimens were also measured. A tear picture was recorded using a CCD video shutter camera which was attached to a stepper motor-operated x/y slide. This was then transferred to an image recording map and digitalised, and the tear contour length as determined using software, after locating the tear lips and tear base by gauging the black area/line of the tear. The tear propagation rate dlnc/dn=1/c(dc/dn) was determined from the dependence of the tear contour length on the number of load cycles, and was used to give the range of the measured data before catastrophic tear growth occurred.

As had been shown by correlation with tire tests (see A. J. M. Sumner, S. A. Kelbch, U. G. Eisele, Rubber World 213, No. 2, 38 (1995)), inner liner compounds are subjected to constant strain loading when the tire is in operation, so that a comparison of tear propagation rates at constant strain had to be made.

The tear resistance of the compounds investigated was measured on unaged and on aged (168 hours at 120° C., circulating air cabinet) specimens.

The adhesion to the carcass was measured on sandwich test specimens (butyl compound/carcass compound) with a textile backing, which had been vulcanised for 30 minutes at 166° C. under pressure. The adhesive strength was defined as the force of separation which was necessary in order to separate the two compounds.

The results of Table 3 show the following:

The adhesion to the carcass of compound M(F) comprising comparison rubber F, which had a low content of bromine and calcium stearate and a higher proportion of double bonds, was significantly lower than that of compounds M(A) to M(D) according to the invention. However, it exhibited no increase in modulus after ageing and exhibited good dynamic tear resistance. On the other hand, compound M(E), which had the usual content of bromine, calcium stearate and double bonds, exhibited good adhesion, but exhibited an increase in modulus after ageing and had the poorest tear resistance.

As can be seen from the Table, an increase in modulus after ageing had a negative effect on the tearresistance of inner liner compounds.

Compound M(G), comprising comparison rubber G, which was a blend of butyl and bromobutyl rubber, exhibited a better resistance to ageing but also exhibited a reduced rate of vulcanisation. A reduction in the rate of vulcanisation results in reduced adhesion to the carcass when normal vulcanisation temperatures and times are employed.

From the data for compounds M(A) to M(D), it is clear that reducing the content of bromine and calcium stearate did not alter the modulus and permeability of unaged specimens. A decrease in adhesion was only observed for the lowest content of bromine and calcium stearate (1.2% Br, 1.05% Ca stearate). A significant reduction in tear propagation rates was found compared with the standard; this was even more pronounced after ageing. Bromobutyl rubbers A to C are particularly recommended for use in inner liner compounds for long-life truck tires having a properly proportioned balance of critical properties.

TABLE 1

Butyl rubbers used

| BIIR | Bromine content, % | Content of non-halog. double bonds, % | Content of fatty acid salts, % | Content of calcium salts, % | Content of sodium salts, % | Stabilisers, % |
|---|---|---|---|---|---|---|
| A | 1.76 | 0.77 | 2.10 | <0.02 | <0.02 | 1.35 |
| B | 1.66 | 0.82 | 1.88 | <0.02 | <0.02 | 1.28 |
| C | 1.37 | 0.93 | 1.45 | <0.02 | <0.02 | 1.10 |
| D | 1.21 | 1.02 | 1.05 | <0.02 | <0.02 | 0.95 |
| Comparison example E[1] | 1.94 | 0.65 | 2.45 | <0.02 | <0.02 | 1.50 |
| Comparison example F | 1.05 | 1.10 | 0.95 | <0.02 | <0.02 | 0.85 |
| Comparison example G[2] | 1.40 | 1.12 | 1.85 | <0.02 | <0.02 | 1.05 |

[1] Polysar Bromobutyl 2030 (supplied by Bayer)
[2] A blend of 70 parts Polysar Bromobutyl 2030 and 30 parts Polysar Butyl 402[3] (supplied by Bayer)
[3] Polysar Butyl 402 was not brominated and had a double bond content of 2.2%; Mooney (ML1 + 8 100° C.) 47

TABLE 2

Composition of bromobutyl rubber compounds

| Compound | BIIR A | BIIR B | BIIR C | BIIR D | BIIR E | BIIR F | BIIR G | Carbon black | Mineral oil | Resin | Stearic acid | MBTS | Zinc oxide | Sulphur |
|---|---|---|---|---|---|---|---|---|---|---|---|---|---|---|
| M(A) | 100 | | | | | | | 60 | 7 | 4 | 1 | 1.3 | 3 | 0.5 |
| M(B) | | 100 | | | | | | 60 | 7 | 4 | 1 | 1.3 | 3 | 0.5 |
| M(C) | | | 100 | | | | | 60 | 7 | 4 | 1 | 1.3 | 3 | 0.5 |
| M(D) | | | | 100 | | | | 60 | 7 | 4 | 1 | 1.3 | 3 | 0.5 |
| M(E) | | | | | 100 | | | 60 | 7 | 4 | 1 | 1.3 | 3 | 0.5 |
| M(F) | | | | | | 100 | | 60 | 7 | 4 | 1 | 1.3 | 3 | 0.5 |
| M(G) | | | | | | | 100 | 60 | 7 | 4 | 1 | 1.3 | 3 | 0.5 |

TABLE 3

Physical properties of vulcanised rubber materials

| | Properties of compound Rheometer testing | | | 50% modulus, MPa | | Tear growth rate 1/c(dc/dn), Mc$^{-1}$ at 20% strain; T = 70° C. | | Adhesion to carcass, | Permeability to gas (air), |
|---|---|---|---|---|---|---|---|---|---|
| | Scorch time $t_{s1}$, min | Vulcanisation time $t_{90}$, min | Max. torque dNm | unaged | aged for 168 hours at 120° C. | unaged | aged for 168 hours at 120° C. | kN/m; at 100° C. unaged | m$^2$/sPa; at 65° C. unaged |
| M(A) | 1.83 | 7.05 | 5.18 | 0.8 | 1.2 | 3.23 | 26.15 | 14.08 | 3.0 |
| M(B) | 1.92 | 8.32 | 4.99 | 0.8 | 1.1 | 2.35 | 15.67 | 13.94 | 3.1 |
| M(C) | 2.18 | 9.15 | 4.95 | 0.8 | 1.0 | 1.83 | 5.21 | 11.34 | 3.0 |
| M(D) | 2.22 | 10.8 | 4.89 | 0.8 | 0.9 | 1.25 | 2.98 | 7.44 | 3.1 |
| M(E) | 1.79 | 5.83 | 5.98 | 0.9 | 1.3 | 5.44 | 55.54 | 13.60 | 2.9 |
| M(F) | 2.38 | 11.77 | 5.42 | 0.8 | 0.8 | 2.50 | 3.34 | 4.19 | 3.0 |
| M(G) | 2.35 | 11.53 | 5.68 | 0.8 | 1.0 | 2.42 | 10.74 | 5.9 | 3.0 |

We claim:

1. Halogenated butyl rubbers having a halogen content of 0.5 to 2.5% and a residual content of non-halogenated double bonds of 0.7 to 1.0 mole %, and a content of antiagglomeration/vulcanisation control agents of 1.0 to 2.2% by weight, with respect to the total amount of halogenated butyl rubber.

2. A method of producing halogenated butyl rubbers according to claim 1, characterised in that butyl rubbers which have a content of antiagglomeration/vulcanisation control agents of 1.0 to 2.2% by weight with respect to the total butyl rubber used are treated with halogenating agents in the gas phase or in the presence of an organic solvent until the butyl rubber has a halogen content of 0.5 to 2.5% by weight and a content of non-halogenated double bonds greater than 0.7 mole %.

* * * * *

UNITED STATES PATENT AND TRADEMARK OFFICE
CERTIFICATE OF CORRECTION

PATENT NO. : 5,886,106
DATED : March 23, 1999
INVENTOR(S) : Anthony Summner et al.

It is certified that error appears in the above-identified patent and that said Letters Patent is hereby corrected as shown below:

On the cover sheet under [73] Assignee, "Aktiengesellschat" should read -- Aktiengesllschaft --.

Column 2, line 22, "2neopentyl-" should read -- 2-neopentyl- --.

Signed and Sealed this

Tenth Day of August, 1999

Attest:

Q. TODD DICKINSON

Attesting Officer    Acting Commissioner of Patents and Trademarks